(12) United States Patent
Sterner

(10) Patent No.: US 7,797,994 B2
(45) Date of Patent: Sep. 21, 2010

(54) METHOD FOR DETERMINING ADDITIONAL FUEL CONSUMPTION IN A MOTOR VEHICLE AND METHOD FOR DISPLAYING ADDITIONAL FUEL CONSUMPTION

(75) Inventor: Quirin Sterner, Wolkertshofen (DE)

(73) Assignee: Audi AG, Ingolstadt (DE)

( * ) Notice: Subject to any disclaimer, the term of this patent is extended or adjusted under 35 U.S.C. 154(b) by 1 day.

(21) Appl. No.: 10/579,530

(22) PCT Filed: Oct. 29, 2004

(86) PCT No.: PCT/EP2004/012233

§ 371 (c)(1),
(2), (4) Date: May 16, 2006

(87) PCT Pub. No.: WO2005/050146

PCT Pub. Date: Jun. 2, 2005

(65) Prior Publication Data

US 2007/0088493 A1    Apr. 19, 2007

(30) Foreign Application Priority Data

Nov. 17, 2003  (DE) .................. 103 53 689

(51) Int. Cl.
*G01M 15/04*   (2006.01)
(52) U.S. Cl. ................................... 73/114.52
(58) Field of Classification Search ............. 73/114.52, 73/114.53, 114.54, 114.58, 114.59
See application file for complete search history.

(56) References Cited

U.S. PATENT DOCUMENTS

| 5,205,161 | A  | * | 4/1993  | Erwin ......................... 73/114 |
| 5,336,932 | A  |   | 8/1994  | Barske |
| 5,397,991 | A  | * | 3/1995  | Rogers ....................... 320/125 |
| 6,215,283 | B1 | * | 4/2001  | Desroches et al. ............ 322/15 |
| 2006/0276937 | A1 | * | 12/2006 | Yamashita .................. 700/291 |

FOREIGN PATENT DOCUMENTS

DE    EP 0 855 579    7/1998

OTHER PUBLICATIONS

Toya Megumi; Fuel Consumption Relative Display Device for Vehicle; Mar. 31, 2000; (Patent Abstracts of Japan).
Christie-Joy Brodrick et al, Effects of Engine Speed an d Accessory Load on Idling Emissions from Heavy-Duty Diesel Truck Engines; Sep. 2002; pp. 1026-1030.

* cited by examiner

*Primary Examiner*—Eric S McCall
(74) *Attorney, Agent, or Firm*—Novak, Druce + Quigg LLP

(57) ABSTRACT

The invention relates to a method for determining fuel consumption in a motor vehicle with an internal combustion engine and a generator which is driven by the internal combustion engine, characterized in that additional fuel consumption produced by an electric consumer which is connected to the generator is determined. In order to determine fuel consumption, at least one current value of the generator drive capacity is taken into account. The invention also relates to a method for displaying fuel consumption, characterized in that the excess fuel consumption caused by an electric consumer on board the motor vehicle is displayed in a separate manner.

9 Claims, 1 Drawing Sheet

METHOD FOR DETERMINING ADDITIONAL FUEL CONSUMPTION IN A MOTOR VEHICLE AND METHOD FOR DISPLAYING ADDITIONAL FUEL CONSUMPTION

This application is a §371 of PCT/EP2004/012233, filed Oct. 29, 2004, claiming priority from DE 103 53 689.2, filed Nov. 17, 2003, each of which is hereby incorporated by reference in its entirety.

This invention relates to a method for determining the additional fuel consumption in a motor vehicle with an internal combustion engine and a generator, especially the determination of the additional fuel consumption depending on the electrical consumers in the motor vehicle. The invention furthermore relates to a method for displaying additional fuel consumption determined in this way.

BACKGROUND OF THE INVENTION

Determining the fuel consumption and displaying it to the driver in motor vehicles are known. A process for determining the fuel consumption in motor vehicles is described for example in European Patent Application EP 1 205 738 A2. In this connection the fuel consumption is computed by means of the relative, indicated, instantaneous torque which can be delivered by the internal combustion engine, and a quantitative constant for the indicated torque and the output speed of the internal combustion engine and cylinder charge per revolution. Thus the total fuel consumption is determined with this process.

The fuel which is consumed in the motor vehicle is used however for various purposes. On the one hand, the fuel drives the engine which in turn can be used to propel the entire vehicle via the transmission, on the other hand however the generator is also driven by way of the engine. The generator supplies electrical consumers in the motor vehicle with the required voltage. These electrical consumers in a motor vehicle can be for example the air conditioning system or the rear window defroster. When these consumers are activated in a motor vehicle, that is to say, generally turned on the by driver, the generator must make available the required voltage and hence the fuel consumption of the vehicle increases.

By computing the total fuel consumption as is described for example in European Patent Application EP 1 205 738 A2, reliable determination of this additional fuel consumption cannot be ensured. In particular, in the process of the prior art it cannot be ensured that the driver will receive the information that the increased fuel consumption has been caused by the additionally activated electrical consumer and what amount this fuel increase has. Even if an increase in fuel consumption were recognized by the process of the prior art when an electrical consumer is turned on, and even if the driver were notified of this by the indication of a higher numerical value, it would not be apparent to the driver what caused this increase. In this context it must be considered in particular that the fuel consumption for producing the electrical energy for driving the electrical consumers is relatively low compared to the overall fuel consumption. A slight increase of the fuel consumption could therefore be overlooked by the driver or could possibly be attributed to another action, such as for example depressing the gas pedal.

Therefore the object of the invention is to make available a process with which during vehicle operation values for fuel consumption can be determined which accurately indicate the consumption which is caused by the electrical consumer. Furthermore, these values should be able to be made available to the vehicle driver in a suitable manner.

SUMMARY OF THE INVENTION

In this process, in a motor vehicle with an internal combustion engine and a generator which is driven by the internal combustion engine, the additional fuel consumption is determined which is caused by an electrical consumer which is connected to the generator. In particular, to determine the additional fuel consumption at least one current value for the mechanical power input of the generator is taken into account.

The efficiency of the generator which is defined by the mechanical power input and output can be established more accurately by taking into account at least one current value for the mechanical power input. The incorporation of this instantaneous generator efficiency determined via at least one current value of the mechanical power input also leads to the additional fuel consumption being able to be determined more accurately. The determination with consideration of the instantaneous actual efficiency thus yields better values than a determination in which an averaged or estimated efficiency is used.

Preferably, to determine the additional fuel consumption, values for the electrical power input of the generator are determined at different times. When using several values of the electrical power input determined for different instants, by means of finding the difference between these values it can be ensured that the efficiency on which the computation of the additional fuel consumption is based expresses the generator efficiency with which the differential power between two of the measured power values is produced. It differs from the total efficiency of the generator. By considering the efficiency for the differential power the determination of the additional fuel consumption is made even more exact.

In one preferred embodiment of the process the electrical power input of the generator is determined for a first instant and a second instant following it in time, the first instant corresponding to the instant at which the electrical consumer is connected.

If the electrical power input at the instant at which an electrical consumer is turned on is measured and a second value which constitutes the electrical power input during operation of the electrical consumer is determined, information can be obtained therefrom regarding by how much the electrical power input of the generator has risen due to the electrical consumer. It thus becomes possible to determine the additional fuel consumption which is caused by the consumer connected last when an electrical consumer is connected at a time at which another electrical consumer is already activated.

According to one embodiment, the electrical power input of the generator can be determined for computing the fuel consumption by way of a generator model. Instantaneous ambient conditions and the instantaneous state of the motor vehicle can be included in this model. In this way the determination of the value of the electrical power input becomes even more accurate. The generator model can be filed in the engine control device of the motor vehicle.

Alternatively or additionally, values which are necessary for determining the electrical power input can be determined from the characteristics. These values can be incorporated into the generator model, or the electrical power input is read out directly from the characteristic field. The characteristic fields can likewise be filed by the engine control device.

Preferably in the process as claimed in the invention mechanical and electrical losses are taken into account. By incorporating the losses which occur, the determination of the electrical power input of the generator and thus the fuel consumption determination can deliver more accurate values.

The values for the power loss can also be taken from the characteristic fields or can be computed by a generator model.

The input quantities for a generator model can be for example the engine speed, the ambient temperature, the transmission ratio, the voltage of the vehicle electrical system, and the excitation current for the generator. The electrical power output of the generator and the overall power loss (mechanical, electrical and thermal power loss) can be determined from these input quantities and optionally from additional quantities.

According to another aspect, the invention relates to a process for displaying the fuel consumption in a motor vehicle, the additional fuel consumption which is caused by the electrical consumer on board the vehicle being displayed separately.

The display device can constitute a digital or needle display device, a separate display being defined as the additional fuel consumption being displayed separately from the total fuel consumption. This separate display can be effected by means of the same display device which is used for the total consumption.

In one preferred embodiment the additional fuel consumption is displayed together with the indication of the electrical consumer causing the additional fuel consumption.

This affords the possibility of providing the driver with information about how much fuel is being consumed by the electrical device in the motor vehicle activated by him. It is thus left up to the driver whether this additional fuel consumption is acceptable or whether the electrical device should be turned off.

In one embodiment of the display process, the value of the additional fuel consumption is determined by way of the determination process as claimed in the invention and is sent to the display device.

The advantages and features which have been described with respect to the process for determining the fuel consumption, if applicable, also apply to the process for display of the additional fuel consumption.

DETAILED DESCRIPTION OF THE PREFERRED EMBODIMENT OF THE INVENTION

Figure 1:
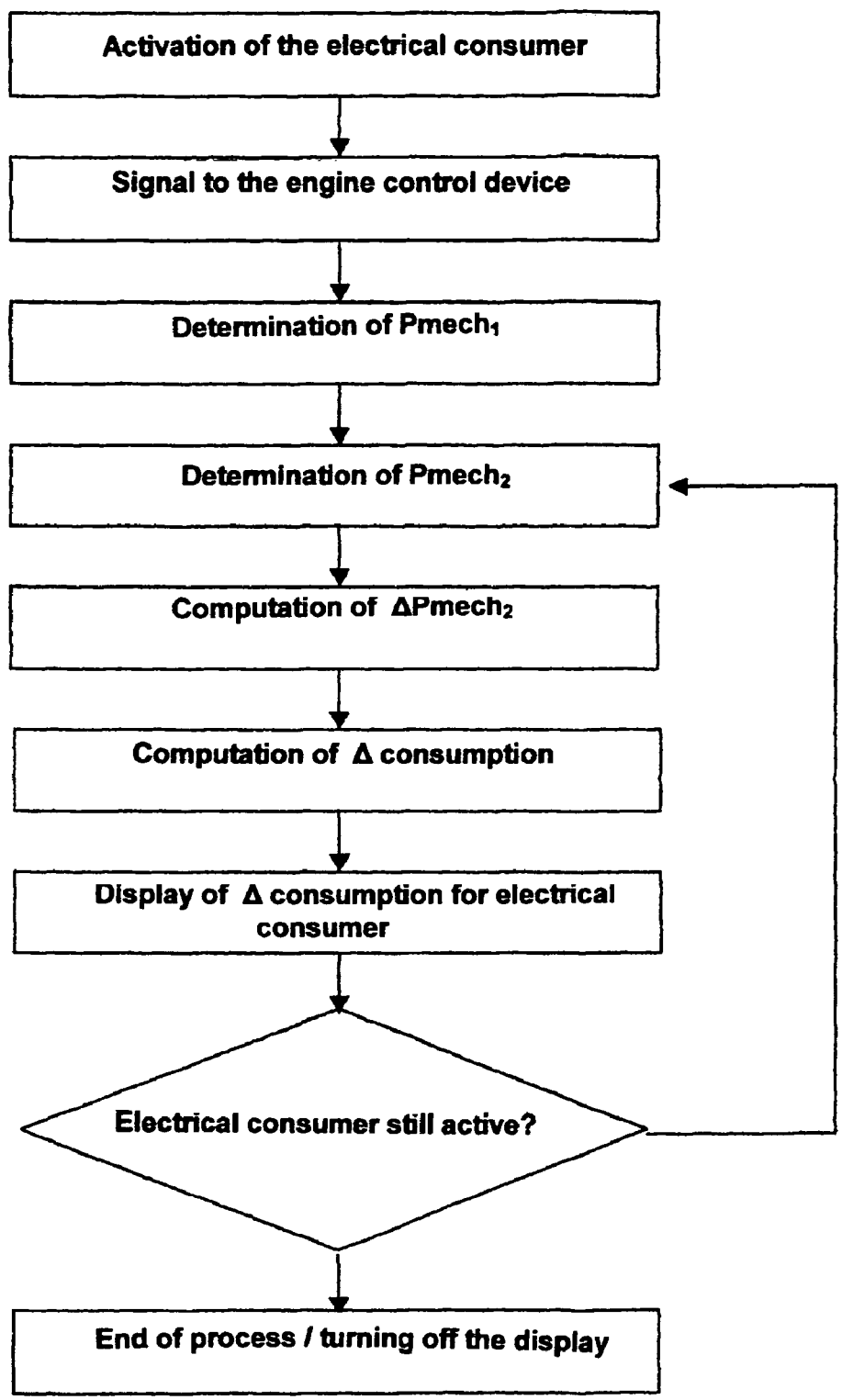
FIG. 1 shows a flowchart of the progression of one embodiment of the process as claimed in the invention.

If, with the internal combustion engine of the motor vehicle running, an electrical consumer, for example the rear window defroster, is switched on, a signal is transmitted to the engine control device. Based on this signal, the determination of the additional fuel consumption is initiated. For this purpose, first the electrical power input $Pmech_1$ is computed for the instant at which the electrical consumer has been turned on, but not yet activated, i.e., has been supplied with power. At a second instant which can be for example a few seconds or minutes after the instant of connection, the electrical power input $Pmech_2$ of the generator is then computed. The differential power $\Delta Pmech$ is computed from these two values.

Then the difference in fuel consumption, i.e., the additional fuel consumption, is determined from this value. This value is supplied to a display device via which the additional fuel consumption is displayed to the driver. Then the engine control device checks whether the electrical consumer is still in the active state, i.e., is still connected. If this is the case, in this embodiment a value is determined again for the electrical power input $Pmech_2$ for another instant, and as in the first process cycle the difference from the initial value of the electrical power input is determined. The additional fuel consumption determined with this recomputed value is then routed to the display device and displayed to the driver. If it is ascertained by the engine control device that the electrical device is no longer active, the process is terminated.

The determination of the electrical power input Pmech can be done in different ways. On the one hand, the electrical power input of the generator can be determined by the sum of the electrical power output and the power loss according to the following formula:

$$P_{mech} = P_{power\ output} + P_{loss}$$

The values necessary for this computation can be obtained alternately by means of a generator model and/or can be taken from the characteristics.

In one possible generator model, the input quantities are the generator rpm, the voltage of the vehicle electrical system, the excitation current of the generator, the ambient temperature and the transmission ratio. In this connection the generator rpm can be determined from the engine rpm and the transmission ratio, which is for example 2.4. This value is made available by the engine control device or via the CAN bus. It is also possible to include the df signal (dynamic field signal) in the generator model. It reproduces the generator load and is needed for computing the output current of the generator. The generator voltage which is furthermore necessary for determining the power can be computed for example by way of the battery voltage, the resistance by the line loss, and the current which is flowing through the line resistance. The values for the electrical power output of the generator and the total power loss can be obtained from such a generator model. With a generator model for example the brush losses, the iron losses, the magnet losses, the diode losses, the mechanical losses as a function of the generator rpm and bearing losses which can be determined by way of the efficiency of the belt drive can be taken into account.

Alternatively the values for the generator mechanical power output and for the power loss can be taken from the characteristic fields.

Furthermore it is also possible to determine the generator mechanical power input by means of values which have been measured for the generator and determined from the characteristic fields. For this purpose the generator torque and the generator rpm can be used as variables. These values are determined by the engine control device or are available by way of tables.

To compute the additional fuel consumption which is caused by this additional power, it is assumed that the efficiency of the generator constitutes the quotient of the mechanical power output and the mechanical power input. It follows from this that the additional fuel consumption is directly proportional to the additional mechanical power input of the generator and can be computed for example by way of the following formula:

$$\Delta Verb = \Delta pel/\eta * k * 100/v = \Delta pmech * k * 100/v$$

wherein $\Delta$Verb: additional fuel consumption in 1/100 km

Pel: additional power output of the generator in kW

Pmech: additional power input of the generator in kW $\eta$: generator efficiency k: proportionality factor in 1/(h*kW)

v: vehicle speed in km/h

The proportionality factor which can constitute an average value for consumption for the effective power for all engines at rpm up to for example 4000 l/m, and which was determined for spark ignition engines for example using the so-called Willans lines, to be 0.264 l/h per kW and for TDI engines for example 0.208 l/h per kW, can be taken from the tables or can be obtained via characteristic fields and averaging processes.

This invention is not limited to the illustrated embodiment of the process and the described computation types.

Within the scope of the invention other computation processes can also be used for the additional fuel consumption as long as they adequately take into account the instantaneous state of the motor vehicle. In particular at least one current value of the electrical power input of the generator must be included in the computation.

Furthermore, it is also possible to deter nine for example the additional fuel consumption for several electrical consumers. This is generally only possible when they are connected in succession. In this embodiment a first value for the electrical power input is determined for the instant of connection of the first and for another instant following this instant of connection. Further checking of the additional fuel consumption after a further time interval then does not take place. If another electrical consumer is turned on, the additional fuel consumption for it is determined in the same way. If the additional fuel consumption at several instants during operation of the electrical consumer is to be checked, before determining the mechanical power input of the generator it is first checked whether another consumer has been activated since the last instant of determination.

In another embodiment the additional fuel consumption for an electrical consumer is determined and displayed not only directly after connection, but also for any change of the operating conditions. This change can be for example the selection of a higher stage in an air conditioning system.

To display the additional fuel consumption, conventional display devices as are provided on the dashboard of the motor vehicle can be used. Preferably a digital display device is used. By means of this display device it is specifically possible to separately display the fuel consumption which is caused by the individual electrical consumers and optionally in addition to provide the driver with information regarding for which electrical consumer the additional fuel consumption is being displayed at the time. Thus, for example the display device can read, Rear window: 0.5 l per 100 km.

With the process as claimed in the invention it thus becomes possible during operation of the motor vehicle to make available to the driver of the motor vehicle information regarding how much fuel is being consumed by the individual electrical devices on the vehicle. This information allows the driver to decide whether the additional fuel consumption is to be tolerated, or whether the electrical device should be turned off. In this way the environmental impact can be reduced, since some electrical devices would generally not be used by drivers or at least less often and for a shorter period of time if they were aware of the additional fuel consumption.

The invention claimed is:

1. A method for determining the fuel consumption of an internal combustion engine caused by at least one electrical consumer in a motor vehicle, wherein the motor vehicle comprises the internal combustion engine, wherein the internal combustion engine is supplied by a generator, wherein the generator is driven by the internal combustion engine, the method comprising determining at least one current value of the generator mechanical power input, and determining the electrical power input of the generator at different times, wherein the electrical power input is determined by means of a generator model.

2. The method as claimed in claim 1 wherein the electrical power input is determined at a first instant and a second instant following the first instant in time, the first instant occurring at the time at which the electrical consumer is connected, briefly prior to the electrical consumer being supplied with current.

3. The method as claimed in claim 1 wherein the electrical power input is determined by means of values from one or more characteristic fields of the generator.

4. The method as claimed in claim 1, wherein mechanical and electrical losses are taken into account when the mechanical power input on the generator is determined.

5. The method as claimed in claim 1 wherein for the generator model input quantities are selected from the group consisting of the engine speed, the ambient temperature, the transmission ratio, the voltage of the vehicle electrical system, the excitation current of the generator, and combinations thereof.

6. The method according to claim 1, further comprising displaying an indication of the fuel consumption caused by the electrical consumer.

7. The method according to claim 1, wherein fuel consumption caused by each of a plurality of electrical consumers is determined.

8. The method according to claim 1, wherein fuel consumption is displayed for each of a plurality of electrical consumers.

9. The method according to claim 1, wherein mechanical and electrical losses are taken into account when the value is being determined for the mechanical power input on the generator.

* * * * *